No. 693,213. Patented Feb. 11, 1902.
C. BAJOHR.
ANCHOR FASTENER FOR LIGHTNING CONDUCTORS.
(Application filed Dec. 4, 1901.)

(No Model.)

Witnesses
Alfred W. Eicks
M. L. Irion

Inventor
Carl Bajohr,
by Higdon & Longan Atty's.

THE NORRIS PETERS CO., PHOTO-LITHO., WASHINGTON, D. C.

UNITED STATES PATENT OFFICE.

CARL BAJOHR, OF ST. LOUIS, MISSOURI.

ANCHOR-FASTENER FOR LIGHTNING-CONDUCTORS.

SPECIFICATION forming part of Letters Patent No. 693,213, dated February 11, 1902.

Application filed December 4, 1901. Serial No. 84,630. (No model.)

*To all whom it may concern:*

Be it known that I, CARL BAJOHR, of the city of St. Louis, State of Missouri, have invented certain new and useful Improvements in Anchor-Fasteners for Lightning-Conductors, of which the following is a full, clear, and exact description, reference being had to the accompanying drawings, forming a part hereof.

My invention relates to anchor-fasteners for lightning-conductors; and it consists in the novel construction, combination, and arrangement of parts hereinafter described, and pointed out in the claims.

The object of my invention is to provide an improved fastener for lightning-conductors and which shall be especially adapted for use upon brick or stone walls.

Figure 1:
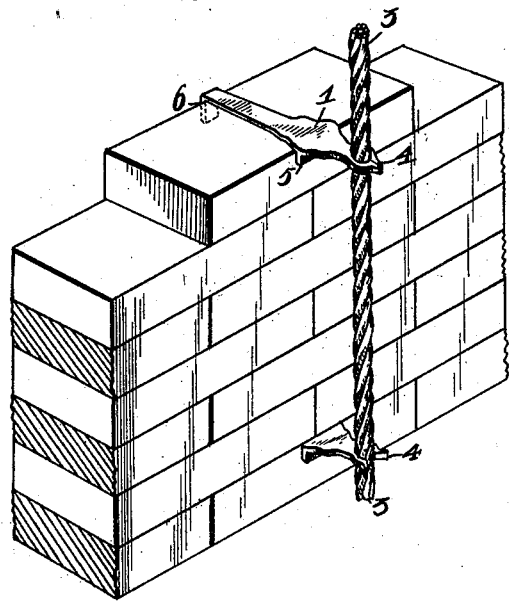
Figure 2:
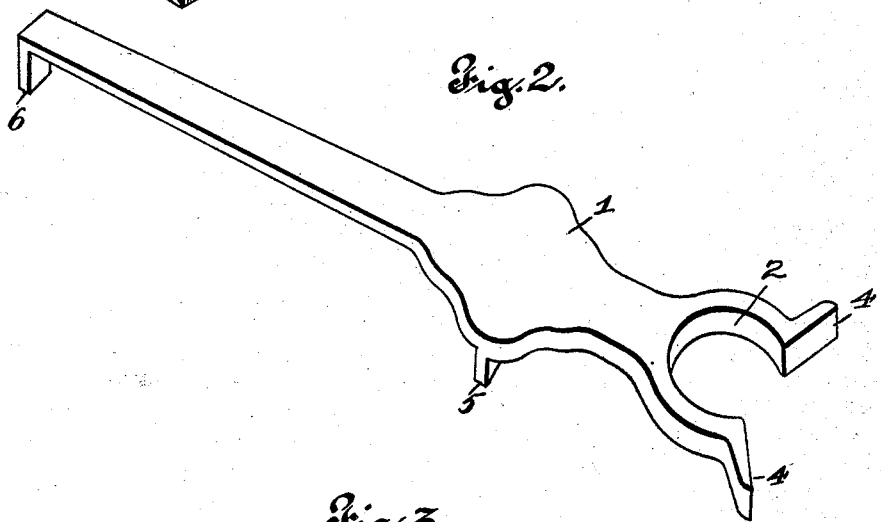
Figure 3:
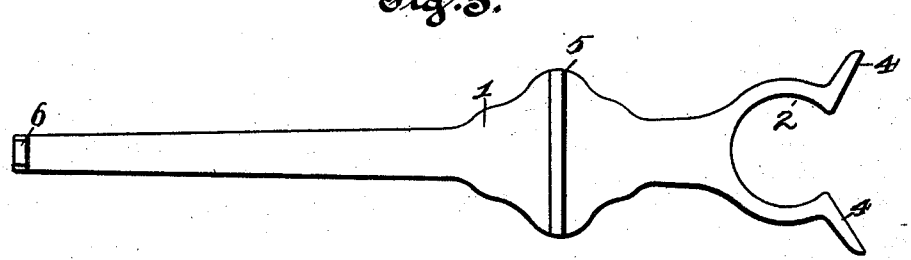

In the drawings, Figure 1 is a perspective view of a section of brick wall to which my invention has been applied. Fig. 2 is a perspective view of the fastener, and Fig. 3 is an inverted plan view of the same.

My fastener is preferably made of bronze or any other metal not readily subject to corrosion when exposed to the atmosphere.

I provide the main body 1 with the socket 2 at its outer end for receiving the conductor 3. This socket is formed of the opposite arms or fingers 4, which may be bent toward each other, and thereby inclose the conductor for the purpose of holding the same securely in position. Projecting from the under side of the body 1 is a flange or shoulder 5, which is adapted to engage the outer face of the brick or stone, and thereby prevent the fastener from being forcibly driven inward and for the purpose of retaining the same in its normal position, as shown. Projecting downwardly from the inner end of the body 1 is another flange or shoulder 6, which is adapted to bear against the inner face of the brick or stone and prevent the fastener from being withdrawn from the wall. The two flanges 5 and 6 also coöperate to prevent the displacement of the fastener when lateral strain is thrown upon either one of its ends. The body 1 is widened or enlarged at the point where the flange 5 is located for the purpose of reinforcing said flange at its ends and also for the purpose of ornamentation.

My improved fastener is to be built in the wall during the construction of the latter and is so designed that it cannot be dislocated by lightning-strokes and electrical forces incident thereto, which is usually the case with the fasteners made in accordance with previous types.

What I claim is—

1. The improved fastener for lightning-conductors, comprising a body made of non-corrosive metal and having a socket at its outer end for the reception of the conductor and provided upon its body with projections or shoulders adapted to engage the wall in which said fastener is to be embedded, substantially as specified.

2. The improved fastener for lightning-conductors, consisting of the body 1, having the socket 2 and arms 4 at its outer end, the flange or projection 6 at its inner end and the flange or projection 5 intermediate of said socket and said flange 6, as and for the purpose specified.

In testimony whereof I affix my signature in presence of two witnesses.

CARL BAJOHR.

Witnesses:
ALFRED A. EICKS,
JOHN C. HIGDON.